US006316509B1

(12) United States Patent
Degerman

(10) Patent No.: US 6,316,509 B1
(45) Date of Patent: Nov. 13, 2001

(54) PROCESS FOR REUSE OF VULCANIZED RUBBER

(75) Inventor: Rolf Degerman, Skellefteå (SE)

(73) Assignee: Rolf Innovatios Corporation, Stratford, CT (US)

( * ) Notice: Subject to any disclaimer, the term of this patent is extended or adjusted under 35 U.S.C. 154(b) by 0 days.

(21) Appl. No.: 09/651,756

(22) Filed: Aug. 30, 2000

Related U.S. Application Data

(62) Division of application No. 09/297,238, filed as application No. PCT/SE97/01815 on Oct. 30, 1997.

(30) Foreign Application Priority Data

Nov. 1, 1996 (SE) .................................................. 9604004
Feb. 7, 1997 (SE) .................................................. 9700425

(51) Int. Cl.[7] ................................. C08J 9/236; C08J 9/32
(52) U.S. Cl. ............................. 521/54; 521/59; 521/84.1; 521/140
(58) Field of Search ................................ 521/54, 59, 140, 521/84.1

(56) References Cited

U.S. PATENT DOCUMENTS 3,615,972 * 10/1971 Morehouse et al. .................... 521/56
5,234,757 * 8/1993 Wong ..................................... 521/54

* cited by examiner

Primary Examiner—Morton Foelak
(74) Attorney, Agent, or Firm—John Lezdey & Assoc

(57) ABSTRACT

The invention relates to a thermoplastic material made from (a) recycled rubber particles, (b) expandable microspheres and (c) a thermoplastic resin other than (b) or (c).

11 Claims, 7 Drawing Sheets

PROCESS FOR REUSE OF VULCANIZED RUBBER

This application is a division of Ser. No. 09/297,238 Apr. 26, 1999 which is a 371 of PCT/SE97/01815 Oct. 30, 1997.

The present invention concerns a new material composition where the main constituent is recycled vulcanised rubber and a process for producing this material.

THE BACKGROUND TO THE INVENTION

Worn out tires are associated with special problems, both regarding recycling and disposal on waste disposal/landfill sites. In addition to containing a rubber matrix comprising natural and/or synthetic rubber, modern tires also contain carbon black, plastisizers, cross-linkers, anti-oxidants, anti-ozone agents and other performance-improving additives plus metal or fibre reinforcement.

In addition to taking up a great deal of space on waste disposal sites, the dumping of tires causes several other problems as well. The shape of the tire causes it to slowly but surely migrate up to the surface of the disposal site and thereby greatly disrupt the degradation process. Tires also have a ling life as they are manufactured to resist both thermal and biological degradation as well as mechanical wear. Furthermore, tires resist ultraviolet radiation, ozone and other oxidants, as well as water and ice. Fires in a used tire depot are especially problematic as they have proven to be very difficult to extinguish. In addition, the fire releases toxic substances both in the smoke and in the water used to extinguish the blaze.

Problems also occur when tires are used as a source of combustion, among other reasons, because of their content of sulphur but also because they contain metals and chemicals.

As no one has so far succeeded in developing a large scale method for devulcanising recycled rubber, this is difficult to use to any great extent in the production of new tires. At present, no more than 2% of old rubber is used in new tires. The problem can be partially overcome by modifying the surface of the rubber particles. Surface modification of rubber particles from ground down tires is a technique that means that the very outer layer of the rubber particles is modified to allow improved adhesion when combined with other materials, e.g. other elastomers. The technique involves exposing the rubber particles to a powerful reactive gas, e.g. fluorine. It is, therefore, not without its problems.

The reuse of rubber from tires has so far been focused on relatively uncomplicated applications, such as blasting mats, mixing in asphalt or in the production of low vibration flooring. Sheared fragments of rubber or rubber granulate can even be used as such, for purposes as improving soil, filling material for building work, e.g. road construction for recreation or trotting tracks, etc. Mixing in with compost has also been suggested. The problem of leaching of metals and poly-aromatic hydrocarbons that can be taken up by the biosystem is nevertheless associated with these applications.

Bearing in mind this background, there is thus a need for new, functional and beneficial materials with a high content of recycled vulcanised rubber.

THE PRIOR ART

According to U.S. Pat. No. 5,157,082 (EP 649 871), one can produce a thermoplastic composition that comprises particles of vulcanised rubber and a polyolefine resin with an addition of a functionalised olefine polymer. Polyolefine resins are, for example, polyethene, polypropene, polybutadiene, polybutylene, polyisoprene or mixtures thereof, preferably polyethene. The functionalised olefine polymer is a co-polymer of at least one olefine comprising hydrated butadiene or isoprene or one or more ethylenically unsaturated organic monomers. To produce useful products with this composition in practice, the mixture must be processed under high pressure. The description mentions process steps such as extruding and compression moulding. These are associated with high costs for mechanical equipment and dies due to the high pressures required. As a consequence, large series are needed if manufacturing is to be profitable.

Also the production of elastic insulating material comprising a large number of separate cavities by using constant shape or expandable microspheres is known, for example via WO 87/06245 and WO 96/11226. According to WO 87/06245, the procedure also requires that the mixture is subjected to a considerable external pressure by compression moulding or similar processing. The microspheres used in that mixture must, therefore have a sufficiently high crush strength. WO 96/11226 concerns a thermoplastic material mixed together with expandable microspheres. The foam material can, after extrusion, be reheated and shaped, for example to make an orthopaedic immobilising element or similar. Other production methods referred to include compression moulding and injection moulding.

EP 692 516 describes a procedure and a material that allows the involvement of waste and recycled material from the production of the same. The possibility of including recycled vulcanised rubber in similar mixtures is not mentioned. In fact, such a measure would be alien to the skilled person, since it is well-known that vulcanised rubber has poor adhesion characteristics and that the mixing of rubber adversely affects the melt characteristics of thermoplastics. In addition, it has been shown that thermoplastics that have been mixed with rubber cannot be fused together with a completely satisfactory result.

SUMMARY OF THE INVENTION

Surprisingly, it has now been shown to be possible to produce a material that uses recycled rubber as its main component without any process step that involves high pressure, be it compression moulding or extrusion.

The material is defined in the enclosed claims 1–5 and is produced by the process according to claims 6–9. The present invention also concerns products produced by the use of the process, as specified in claim 10.

BRIEF DESCRIPTION OF THE DRAWINGS

The invention is described in greater detail with reference to the enclosed schematic drawings, where.

DESCRIPTION OF THE INVENTION

Figure 1:
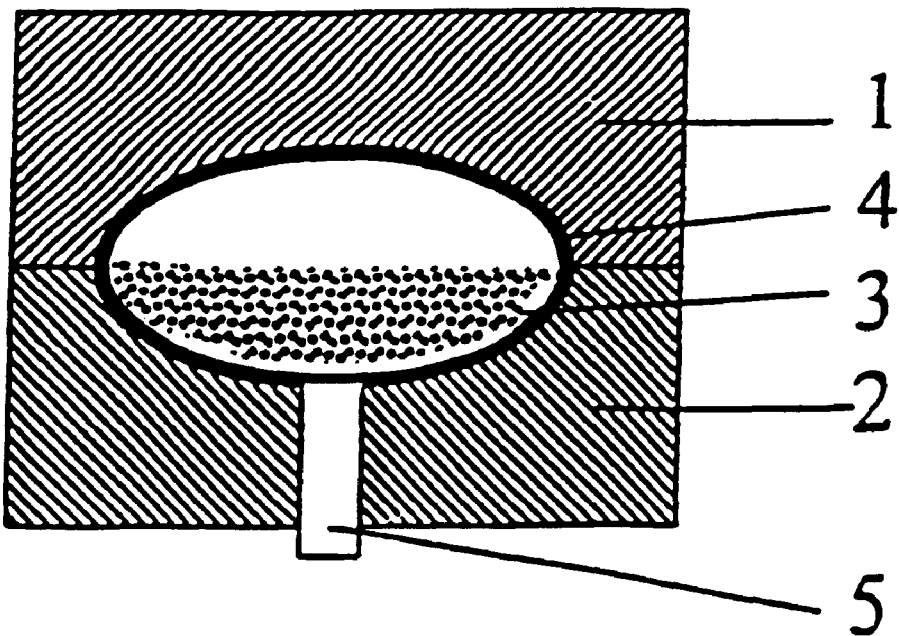
FIG. 1 shows a moulding die partially filled with a particulate mixture according to the invention.
Figure 2:
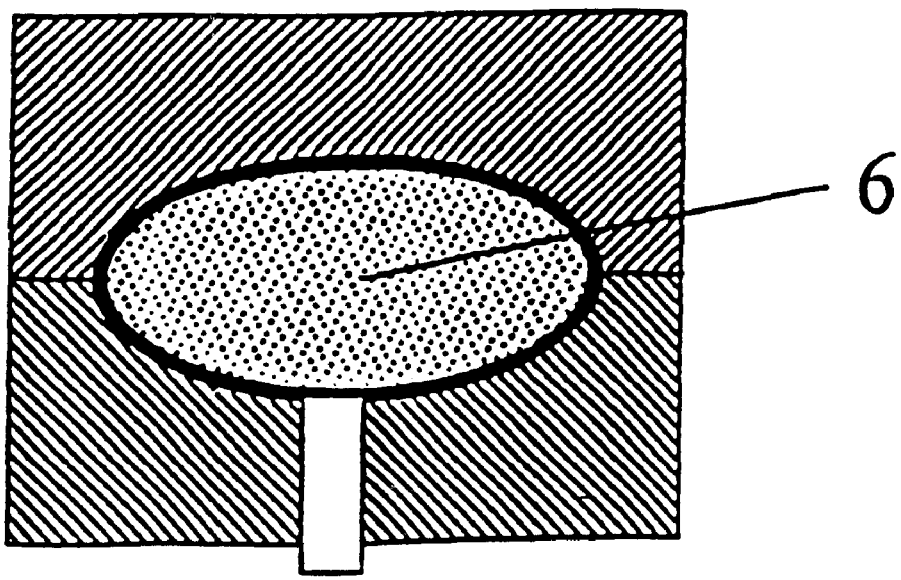
FIG. 2 shows the same moulding die after heating when the material formed has filled the entire cavity.
Figure 3:
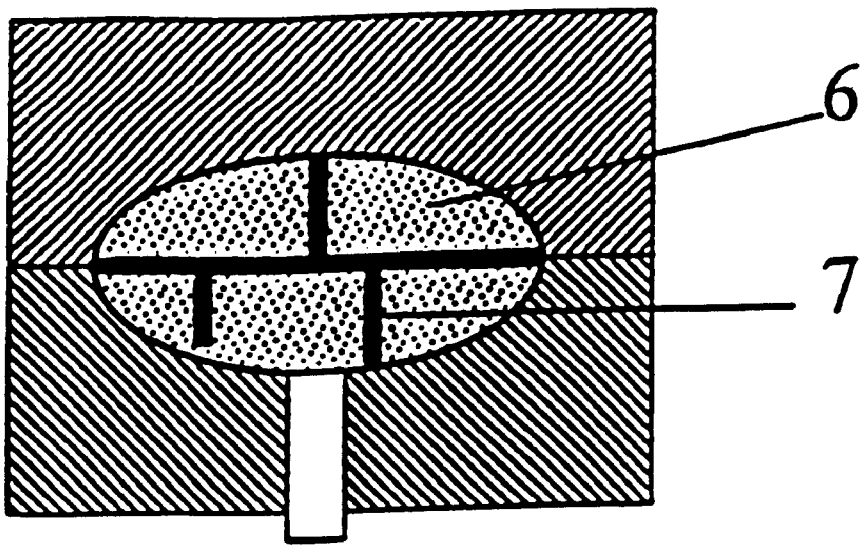
FIG. 3 shows an example of the inclusion of a reinforcing device.
Figure 4:
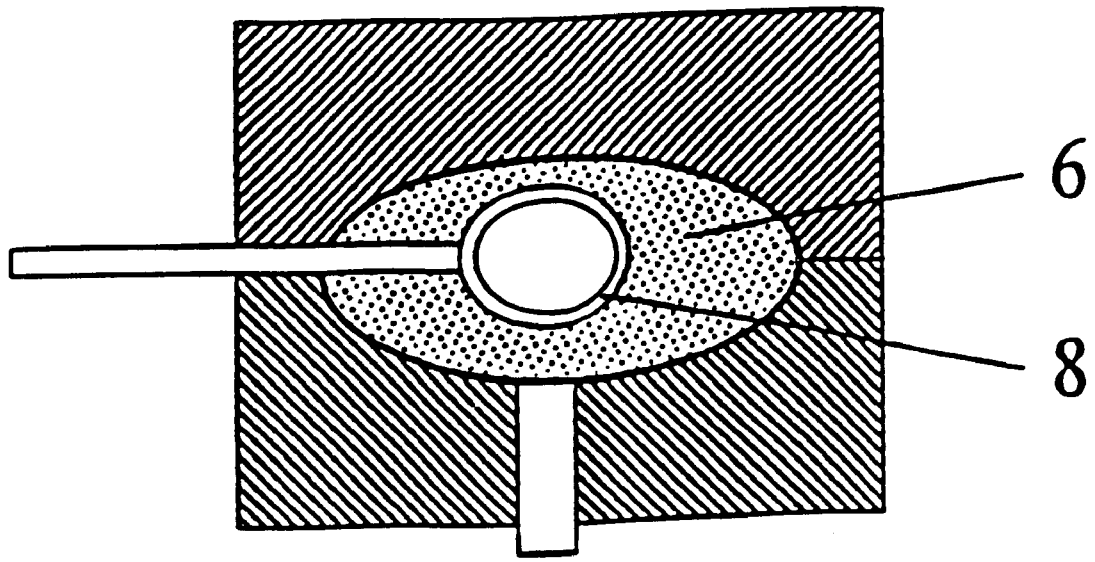
FIG. 4 shows an example of the inclusion of a casting device.

The present invention concerns a material composition where the main constituent is recycled rubber. In addition to recycled particulate rubber, the material composition according to the present invention also comprises a thermoplastic, expandable microspheres plus conventional additives such as a pigment, for example. In one preferred embodiment, however, the composition of the material does consist entirely of particles of recycled rubber, a thermoplastic and expandable microspheres. In a further embodiment, the composition of the material consists entirely of particles of recycled rubber and expandable microspheres.

Particles of recycled rubber (hereafter referred to as rubber particles), can be produced by any chosen conventional means, such as shearing, grinding or cryogenic breakdown of waste rubber products. Old tires are just one of many possible sources. Even other rubber products, spillage from production or similar can be used. The term "rubber" in this context means all vulcanised elastomer mixtures of natural or synthetic origin. According to the invention, the rubber particles have an average size of less than 10 mm. A powder with an particle average size in the interval less than approx. 0.2 mm or less than approx. 0.4 mm is a suitable form. Rubber particles can also be supplied as granules with a particle size from approx. 1 to approx. 4 mm or as sheared particles with a size from approx. 1 to approx. 10 mm and with remnants of the fabric or steel cord remaining.

A suitable material composition is as follows (in percentage weight): 40–98% rubber particles, 10–30% of a thermoplastic and 2–30% expandable microspheres. Ideally, the amount of rubber particles falls in the interval 60–90% weight, the thermoplastic approximately 10–30% weight and the expandable microspheres approximately 2–20% weight.

According to the invention, the microspheres are chosen from commercially available sythetic thermoplastic polymers such as PE, PP, EVA or EPM. Polypropene is suitable to use. The thermoplastic is supplied in powder or granulate form. According to the invention, the microspheres are chosen from commercially available expandable microspheres such as microspheres sold under the trade mark EXPANSEL® (Akzo Nobel AB). In this context, microsphere refers to a hollow gas-filled sphere of a thermoplastic material. These are typically produced by surrounding a condensed drop of propellant gas, isobutane, for example, with a impermeable layer, for example, a co-polymer of vinylidene chloride and acetonitrile. When it expands, the sphere's volume can increase more than 60 fold and its diameter increase from about 1–5 $\mu$m to about 10–200 $\mu$m. Expanded microspheres are therefore extremely light with densities as low as approx. 0.03 g/cm$^3$. The expanded microspheres demonstrate an elastic capability and revert to their original volume when the applied load is removed.

The procedure according to the present invention is now described in more detail with reference to FIGS. 1–4. The previously defined component parts, perhaps with fewer pigment additives, is mixed well. The resulting particulate mixture or powder is easy to handle, does not form lumps and can be stored at room temperature. The particulate mixture 3 is then measured out in moulds consisting of two or more dies (for the sake of simplicity, FIGS. 1–4 shows only two parts or dies constituting the mould, 1 and 2) that delimit the cavity that forms the shape and size of the product that is to be produced. It is suitable to fill the shape of the cavity to about half its volume. Mould parts 1 and 2 can have an inner permanent coating of an anti-friction material 4, a layer of silicone, for example.

When the mould cavity has been sealed with mould part 1, the mould is heated until the mixture of powders 3 reaches a temperature where the microspheres begin to expand. This temperature in usually in the range of about 100 to about 150° C. After the mixture has expanded and completely filled the cavity of the mould, the heating is continued until a certain over-pressure is attained in the mould. A suitable pressure is normally in the order of 0.5–1.0 bar. The stated temperature is maintained for a few minutes. A suitable time is about 2 to 30 minutes, for example. The thermoplastic included in the mixture is then integrated with the rubber particles due to the over-pressure that is built up in the mould. After cooling, the body 6 of the shape formed is pressed out of the mould with the plunger 5.

If needed, strengthening elements or reinforcement 7 can be placed in the mould. Such elements or reinforcement can be made up of any chosen material such as metal, glass fibre, wood, organic or inorganic fibres of natural or synthetic origin, for example. If needed, even a casting device 8 can be placed in the form. Examples of casting devices include piping for electrical cables, recesses or notches, or cavities.

Production can therefore occur at pressures in the order of 0.5 bar, which does not place any special demands on the moulds or other equipment. For example, the moulding die can be made of clay, cement plaster, wood or light metal. Coating the inner surfaces of the mould with a layer of silicone creates a moulding die that can be used without the need for releasing agents to be included in the composition of the material. The use of an inner coating of silicone is possible as the material composition will expand at comparatively low temperatures.

Figure 5:
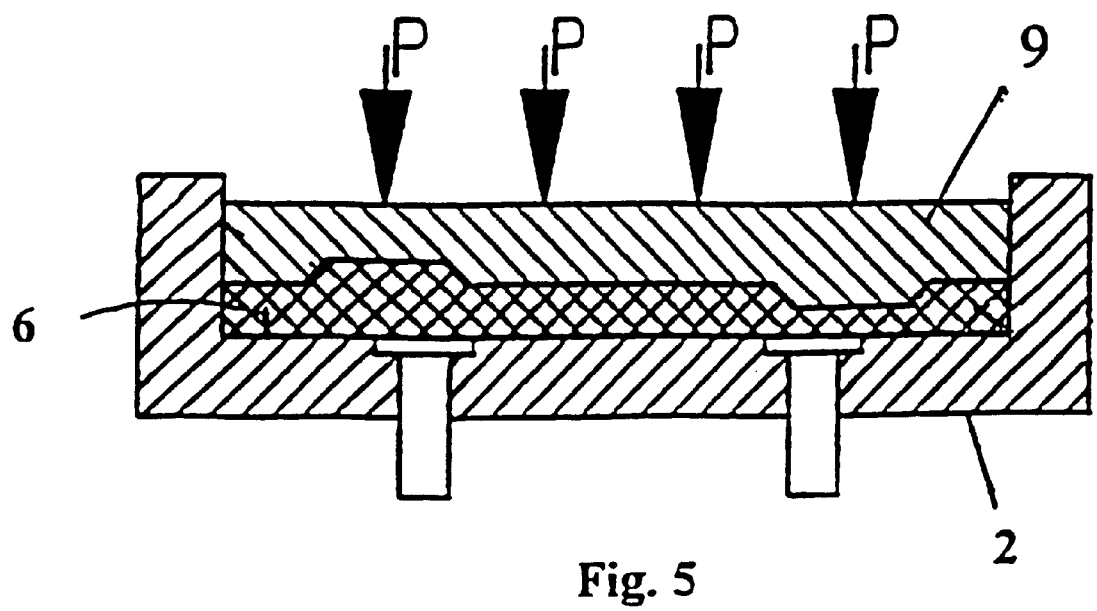
FIG. 5 shows an example of a process step, where a mould is filled with a particulate mixture according to the invention and where the mixture is compressed before heating.

Shaped bodies can also be produced in that a particular mixture according to the invention is compressed before heating by arranging a press plate 9 or upper mould as is shown in FIG. 5.

Figure 6:
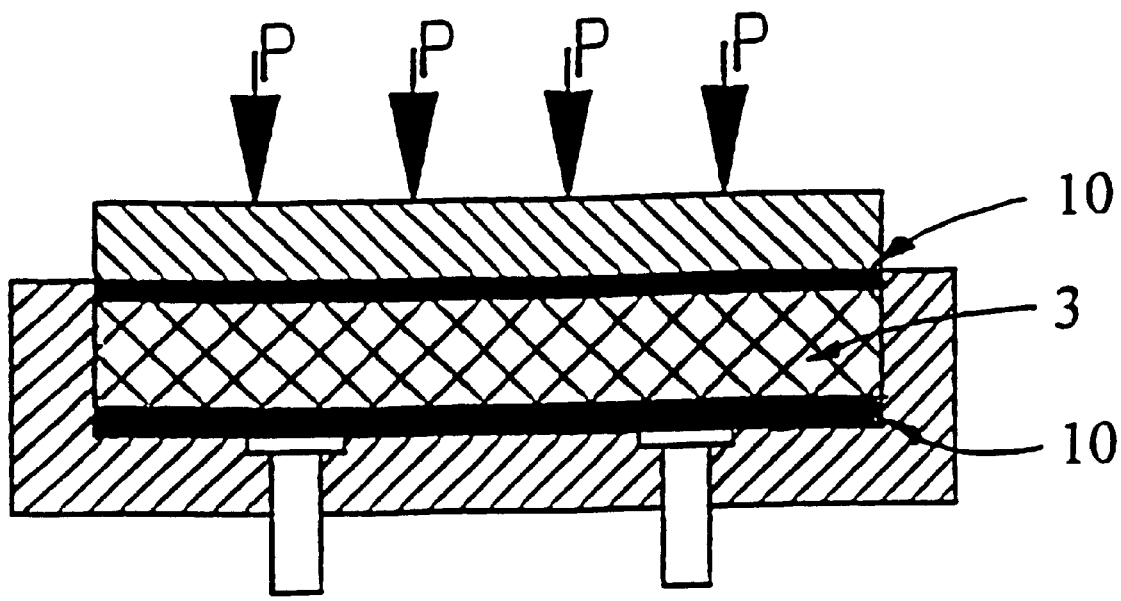
FIGS. 6 and 7 show process steps in manufacturing sandwich constructs comprising the material composition according to the present invention.
Figure 7:
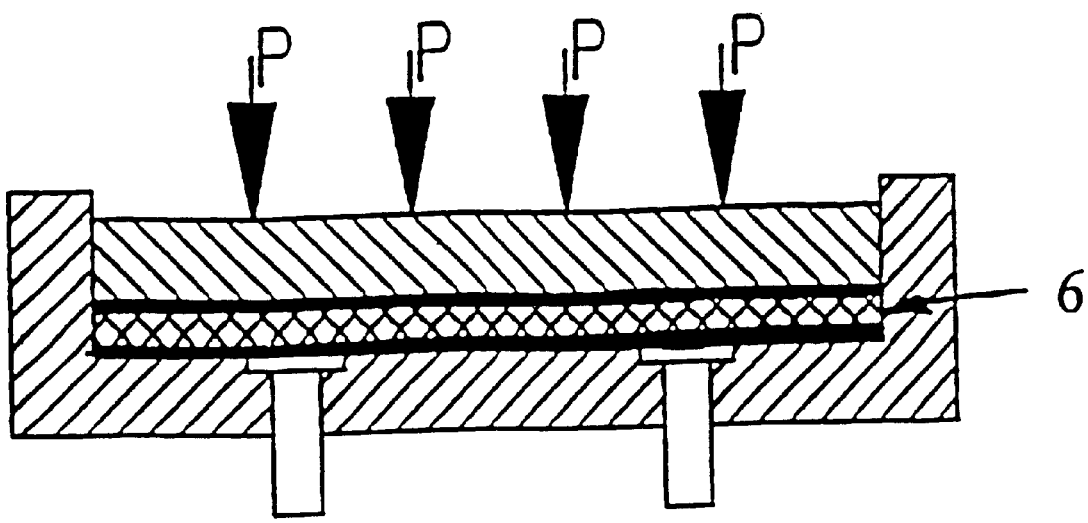

Further, one process for the manufacture of shaped bodies is shown in FIGS. 6 and 7 where a particulate mixture 3 according to the invention is covered at least on one side with a layer 10 of organic or inorganic fibres of natural or synthetic origin, metal, glass fibre, wood or rubber, for example.

Figure 8:
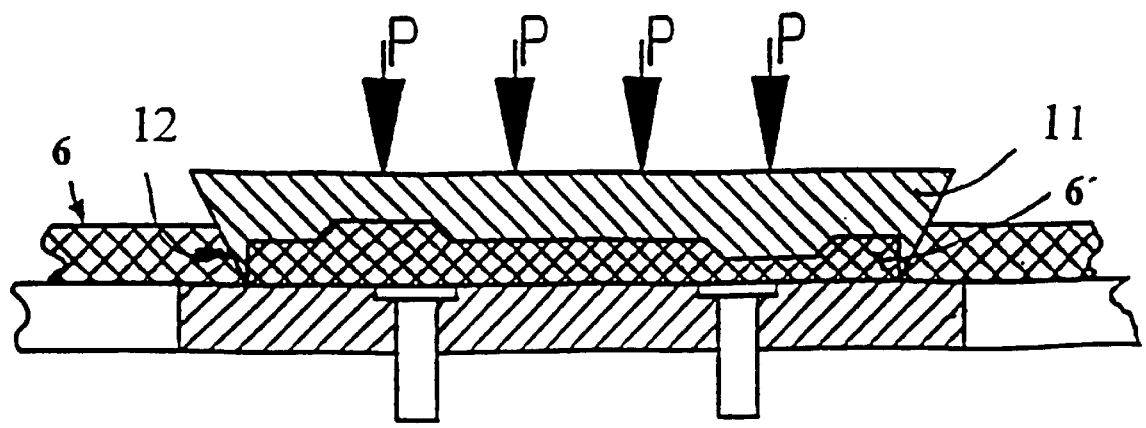
FIG. 8 shows an example of a process step where a pre-formed body according to the invention is heated and thereafter placed in a cutting tool and shaped.

FIG. 8 shows an alternative where an upper press plate 11 has cutting edges 12. A pre-formed body, in this example a sheet 6 of the material according to the invention, is heated to a temperature where it is workable, i.e. its plasticizing temperature. Subsequently, the material sheet 6 is cut and shaped/reshaped.

Figure 9:
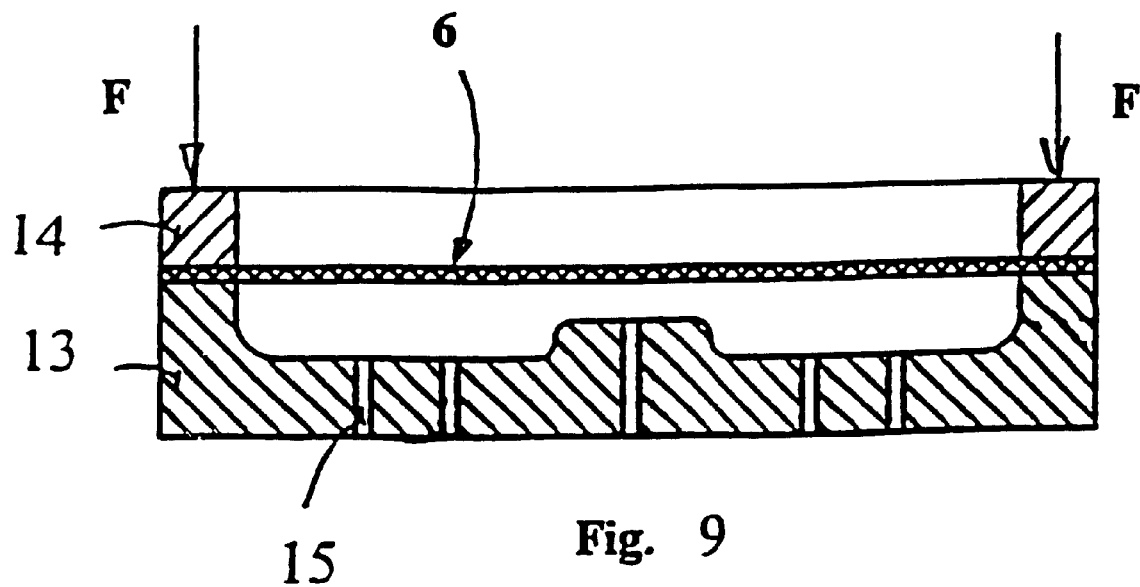
FIGS. 9 and 10 show how a pre-formed body according to the present invention is placed in a moulding die and shaped by the influence of heat and negative pressure.
Figure 10:
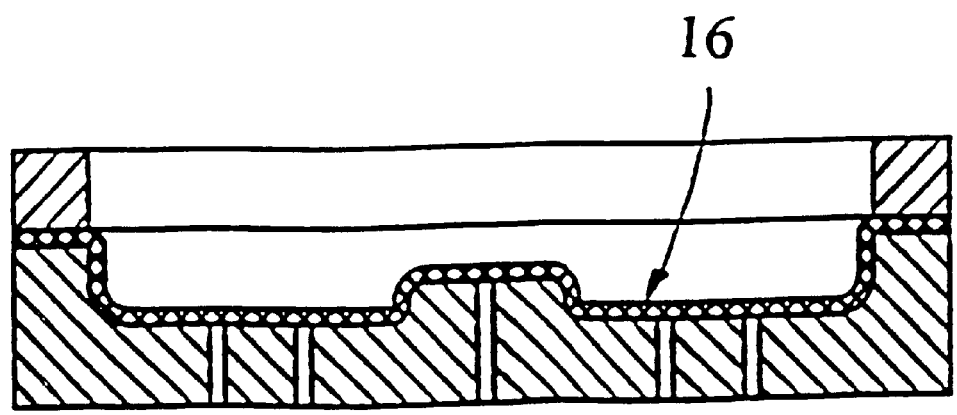

Further, another process for the production of shaped bodies is shown in FIGS. 9 and 10, where a pre-formed and heated body, such as a sheet 6, is placed in an airtight manner over a die 13 and a fastening tool or upper die 14. By evacuating the space formed between the sheet 6 and the die 13 through channels 15, the sheet is pulled towards the die and a reformed body 16 is formed.

According to one embodiment of the invention, the sheet 6 can be pre-shaped or embossed in a suitable manner and thus be given a variable thickness, which during the above vacuum moulding compensates for the extension and strain the body is subjected to. These thickness variations are naturally arranged in such a manner, that the finished body is of a uniform thickness Hereby the drawback of uneven thickness, currently plaguing products manufactured by vacuum moulding of pre-fabricated material, such as a sheet of a material workable upon heating, is avoided.

Figure 11:
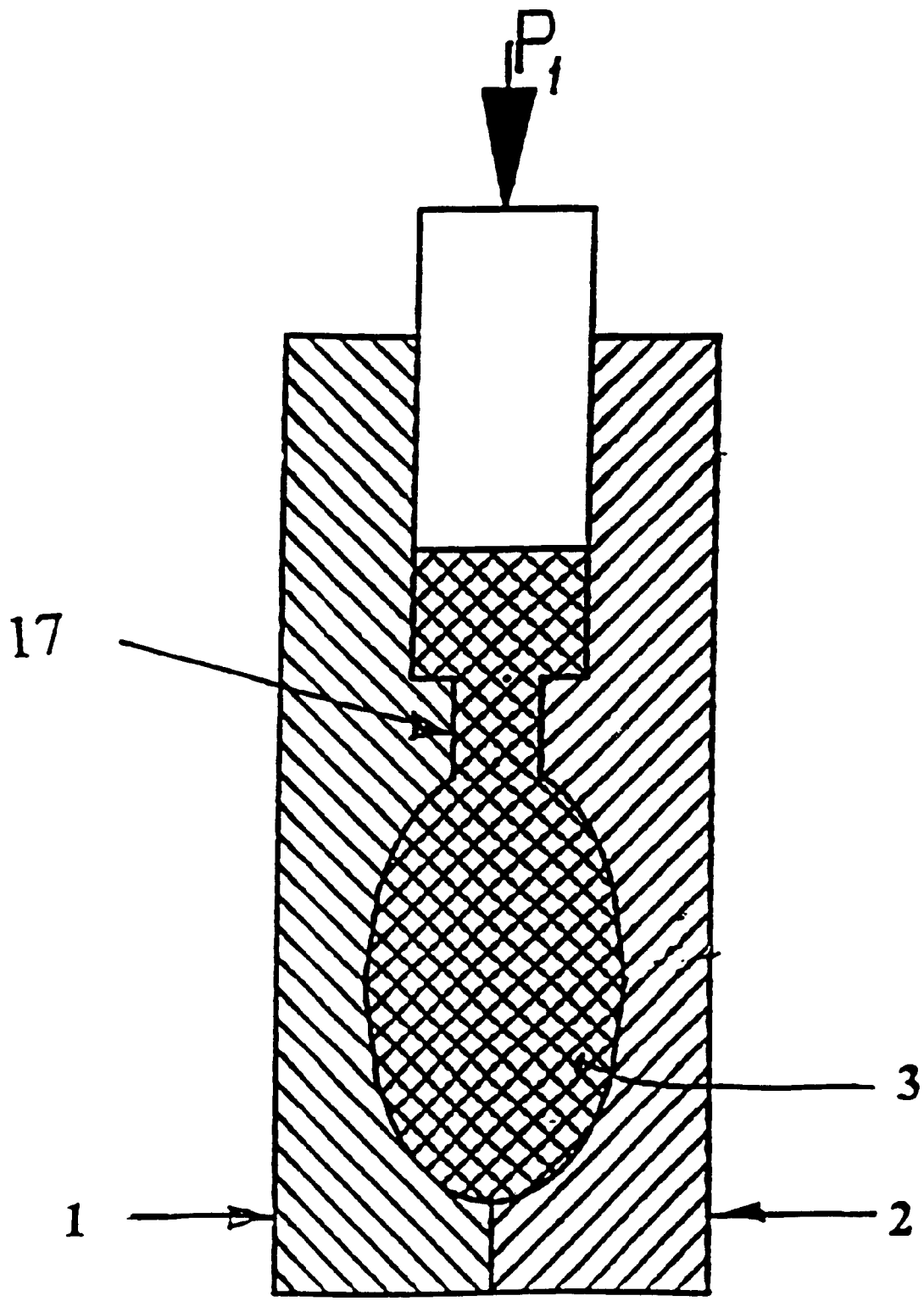

One additional process for manufacturing shaped bodies is shown schematically in FIG. 11 where a material composition according to the invention is enclosed in a cavity limited by two dies, 1 and 2. The inventive composition is subjected to an external pressure P1 during or after heating. The applied pressure is such, that the composition is ensured to form a homogenous and stabile cured product. The pressure is applied through at least one channel 17, in fluid contact with the cavity.

Examples of products that are suitable for production according to the invention presented and which can be made of the material composition according to the invention are, for example, building elements such as flooring underlay, flooring that is insulated against cold, moisture or noise, or filling for sandwich constructions. Other examples of products include compost or waste containers, transport pallets, pontoons and shock absorbers for different applications. The composition of the material according to the invention can be used with advantage as landfill and road insulation.

What is claimed is:

1. A thermoplastic material comprising 40 to 98% by weight of (a) recycled rubber particles 2 to 30% by weight of (b) expandable microspheres and 10 to 30% by weight of (c) a thermoplastic polymer other than (a) or (b).

2. The thermoplastic material of claim 1 wherein said thermoplastic polymer comprises a powder.

3. The thermoplastic material of claim 1 wherein said thermoplastic polymer comprises granules.

4. The thermoplastic material of claim 1 wherein said microspheres are gas filled.

5. The thermoplastic material of claim 4 wherein said gas comprises isobutene.

6. The thermoplastic material of claim 4 wherein said diameter of said microspheres is expanded as a result of heating.

7. The thermoplastic material of claim 1 wherein said microspheres have a diameter of 10 to 20 microns.

8. The thermoplastic material of claim 1 wherein reinforcing material is included in said thermoplastic material.

9. The thermoplastic material of claim 1 wherein said thermoplastic polymer is polypropylene.

10. The thermoplastic material of claim 1 wherein said recycled rubber is recycled tires.

11. A shaped article comprising the thermoplastic material of claim 1.

* * * * *